Apr. 17, 1923.
D. G. ROOS
1,452,313
VENTILATING SYSTEM
Filed Nov. 30, 1918
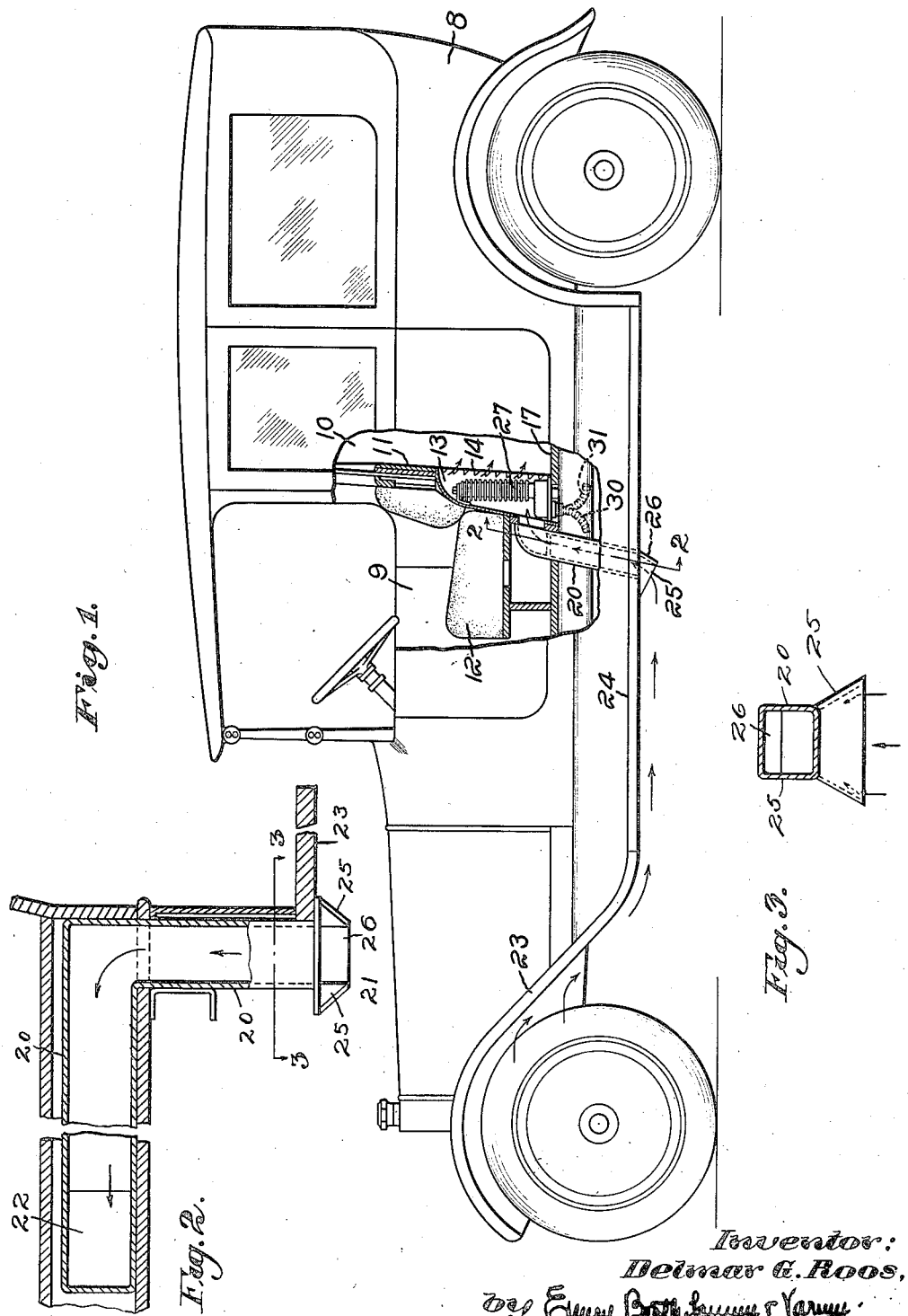
Inventor:
Delmar G. Roos,
by Emery, Booth, Janney & Varney
Attys.

Patented Apr. 17, 1923.

1,452,313

UNITED STATES PATENT OFFICE.

DELMAR G. ROOS, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

VENTILATING SYSTEM.

Application filed November 30, 1918. Serial No. 264,807.

*To all whom it may concern:*

Be it known that I, DELMAR G. ROOS, a citizen of the United States, and a resident of Bridgeport, county of Fairfield, and State of Connecticut, have invented an Improvement in Ventilating Systems, of which the following description, in connection with the accompanying drawings, is a specification, like characters on the drawings representing like parts.

This invention relates to a novel and improved ventilating system for vehicles.

My invention will be best understood by reference to the following description, when taken in connection with the accompanying drawings of one specific embodiment thereof, while its scope will be more particularly pointed out in the appended claims.

In the drawings:

Fig. 1 is a side elevation, partly in section, of a motor vehicle equipped with a ventilating system embodying my invention;

Fig. 2 is a sectional view on an enlarged scale on line 2—2 of Fig. 1; and

Fig. 3 is a sectional view of the air conduit on line 3—3 of Fig. 2.

Referring to the drawings, and to the embodiment of my invention which is illustrated therein, I have shown a motor car having a body 8, which may be and herein is of a closed type known as a limousine, although my invention is by no means limited to any particular type of body, either open or closed. The body selected for exemplification is provided with a front compartment 9 and a rear compartment 10, separated from each other by a partition 11, which may be and in the present example is arranged adjacent the rear of a seat 12 in the front compartment. Intermediate the compartments 9 and 10 is a heating and ventilating chamber 13, which is preferably arranged in advance of the rear face of the partition 11, and is provided with a suitable cover-plate 14, having openings 15 discharging in a rearward direction into the compartment 10. Preferably, these openings are associated with inclined vanes 16, to direct the streams of air in a downward course toward the floor 17 of the compartment 10.

Air is supplied to the chamber 13 from an outside source through an air duct 20, which is provided with an inlet 21 and leads first in an upward direction from said inlet, and then laterally toward the middle of the vehicle, where it is provided with an outlet 22 leading into the front of the chamber 13. It should here be noted that entirely apart from the heating function, the apparatus as thus far described constitutes an excellent ventilating system, and to this end, I have made provision whereby the flow of the air into the rear compartment is assisted by the forward motion of the vehicle. One factor in the accomplishment of this result is the provision of an air duct having a forwardly directed inlet. This inlet, however, should be so arranged that an ample supply of air may be taken in, yet without becoming choked with foreign matter such as mud and snow. I have found that under the running-board of a motor vehicle, usually at a point approximately midway of its length, there is a neutral point where practically no dust will be taken up by the air duct. Moreover, this location is of advantage, because a certain amount of air is compressed under the running-board, due to the action of the front fender, which has a downward inclination. In the drawings, I have shown the motor car equipped with a usual front fender 23, having a downward and rearward inclination, and merging into a usual running-board 24. Thus, the under surface of the running-board and fender provides a downwardly and rearwardly inclined plane, and a horizontal plane extending rearwardly therefrom. Owing to the forward motion of the vehicle, the effect of the inclined plane is to crowd the air toward the ground, as indicated by the arrows in Fig. 1, thereby compressing the air and materially increasing the force with which it enters the air duct.

The inlet or mouth 21 of the air duct is herein in the form of what may be termed a scoop, having rearwardly converging side walls 25 and a rear wall 26, the latter being inclined in an upward and rearward direction. The converging side walls and the inclined rear walls are very effective in gathering up air, and contribute in a marked degree to the efficiency of the system, while the inclination of the rear wall, as shown in Fig. 1, is such that mud and snow will not accumulate thereon, but will fall to the ground. Another factor in the effectiveness of the conduit is due to the fact that the same is upwardly and rearwardly inclined, as shown in Fig. 1. By placing the scoop far enough back along the running-board, it is protected from the mud thrown by the front wheel, and as a rule most of the mud drops to the ground before reaching the scoop. Any that happens to reach the scoop will gravitate therefrom without clogging the inlet, owing to the steep angle at which the rear wall 26 is placed.

Any suitable means may be provided to heat the air which is supplied to the chamber 13. In case the motor vehicle is of the class in which the power is supplied by an internal combustion engine, the exhaust, or a part thereof, may be utilized for furnishing the desired heat. To this end, I have herein provided a radiator 27 disposed within the chamber 13, having an inlet connected by the pipe 30 to the exhaust pipe of the engine, while the outlet will discharge into a pipe 31, which may be led to the usual muffler or suitable point.

Having thus described one embodiment of my invention, what I claim and desire to secure by Letters Patent is:

1. In a ventilating system for vehicles, the combination of a deflecting means provided with a downwardly and rearwardly inclined deflecting surface and a horizontal deflecting surface extending rearwardly therefrom, an air duct having a forwardly directed inlet adjacent the underside of said horizontal deflecting surface, said duct leading in an upward direction from said inlet, and a chamber into which said duct discharges.

2. In a ventilating system for vehicles, the combination of a deflecting means provided with a downwardly and rearwardly inclined deflecting surface and a horizontal deflecting surface extending rearwardly therefrom, an air duct having a forwardly directed inlet adjacent the underside of said horizontal deflecting surface said inlet being provided with rearwardly converging walls, said duct leading in an upward direction from said inlet, and a chamber into which said duct discharges.

3. In a ventilating system for vehicles, the combination of a deflecting means provided with a downwardly and rearwardly inclined deflecting surface and a horizontal deflecting surface extending rearwardly therefrom, an air duct having a forwardly directed inlet adjacent the underside of said horizontal deflecting surface, said duct leading in an upward and rearward direction from said inlet, and a chamber into which said dust discharges.

4. In a ventilating system for vehicles, the combination of a deflecting means provided with a downwardly and rearwardly inclined deflecting surface and a horizontal deflecting surface extending rearwardly therefrom, an air duct having a forwardly directed inlet adjacent the underside of said horizontal deflecting surface said inlet being provided with a rear wall inclined in an upward and rearward direction, said duct leading in an upward direction from said inlet, and a chamber into which said duct discharges.

5. In a ventilating system for vehicles, the combination of a deflecting means provided with a downwardly and rearwardly inclined deflecting surface and a horizontal deflecting surface extending rearwardly therefrom, an air duct having a forwardly directed inlet adjacent the underside of said horizontal deflecting surface, said duct leading first in an upward direction from said inlet and then laterally toward the middle of the vehicle, and a chamber into which said duct discharges.

6. In a ventilating system for vehicles, the combination of a deflecting means provided with a downwardly and rearwardly inclined deflecting surface and a horizontal deflecting surface extending rearwardly therefrom, an air duct having a forwardly directed inlet adjacent the underside of said horizontal deflectitng surface, said duct leading in an upward direction from said inlet, and a chamber into which said duct discharges in a rearward direction.

7. In a ventilating system for vehicles, the combination of a deflecting means provided with a downwardly and rearwardly inclined deflecting surface and a horizontal deflecting surface extending rearwardly therefrom, an air duct having a forwardly directed inlet adjacent the underside of said horizontal deflecting surface, said duct leading in an upward direction from said inlet, and a chamber into which said duct discharges, said chamber having an inlet discharging in a rearward direction.

8. In a ventilating system for vehicles, the combination of a deflecting means provided with a downwardly and rearwardly inclined deflecting surface and a horizontal deflecting surface extending rearwardly therefrom, an air duct having a forwardly directed inlet adjacent the underside of said horizontal deflecting surface, said inlet being provided with rearwardly converging side walls and a rear wall inclined in an upward and rearward direction, said duct leading in an upward direction from said inlet, and a chamber into which said duct discharges.

9. In a ventilating system for vehicles, the combination of a deflecting means provided with a downwardly and rearwardly inclined deflecting surface and a horizontal deflecting surface extending rearwardly therefrom, an air duct having a forwardly directed inlet adjacent the underside of said horizontal deflecting surface, said inlet being provided with rearwardly converging side walls and a rear wall inclined in an upward and rearward direction, said duct leading in an upward and rearward direction from said inlet, and a chamber into which said duct discharges.

10. In a ventilating system for vehicles, the combination of a deflecting means provided with a downwardly and rearwardly inclined deflecting surface and a horizontal deflecting surface extending rearwardly therefrom, an air duct having a forwardly directed inlet adjacent the underside of said horizontal deflecting surface, said inlet being provided with rearwardly converging side walls and a rear wall inclined in an upward and rearward direction, said duct leading in an upward direction from said inlet, and a chamber into which said duct discharges in a rearward direction.

11. In a ventilating system for vehicles, the combination of a deflecting means provided with a downwardly and rearwardly inclined deflecting surface and a horizontal deflecting surface extending rearwardly therefrom, an air duct having a forwardly directed inlet adjacent the underside of said horizontal deflecting surface, said inlet being provided with rearwardly converging side walls and a rear wall inclined in an upward and rearward direction, said duct leading in an upward and rearward direction from said inlet, and a chamber into which said duct discharges in a rearward direction.

In testimony whereof, I have signed my name to this specification.

DELMAR G. ROOS.